J. F. O'CONNOR.
FRICTION SHOCK ABSORBING MECHANISM.
APPLICATION FILED SEPT. 30, 1918.
1,307,315.
Patented June 17, 1919.
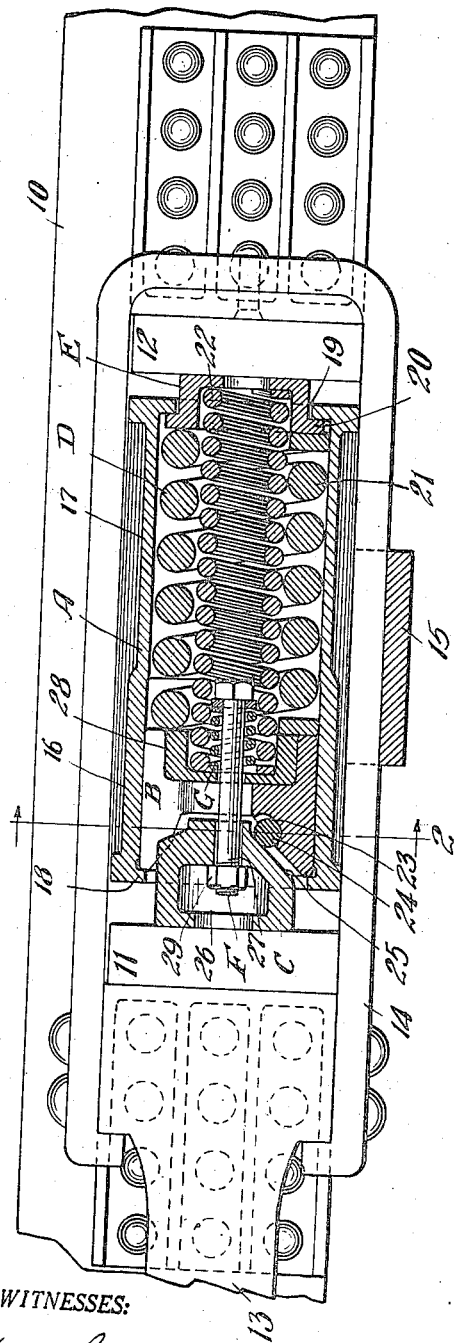
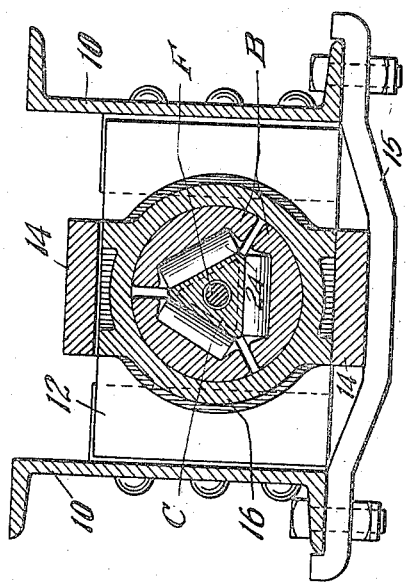
WITNESSES:
Wm. Geiger
INVENTOR.
John F. O'Connor
BY George J. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,307,315. Specification of Letters Patent. Patented June 17, 1919.

Application filed September 30, 1918. Serial No. 256,172.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

Heretofore, in the art of friction shock absorbing mechanisms, and more particularly in such mechanisms as apply to railway draft riggings, it has been customary to employ a so-called "retaining bolt," which extends from the friction elements to the friction shell or casing, the function of the retaining bolt being twofold. One function is to retain all of the parts in assembled relation and the other is to permit the main spring of the gear being placed under an initial compression so that any wear on the friction elements will be automatically taken up during the life of the mechanism. Considerable difficulty has been experienced with these retaining bolts for the reason that the same are subjected to sudden enormous tension shocks when the mechanisms return to normal condition during release. During compressive stroke, the retaining bolts are loose or "float," and, as the parts return to normal position, they acquire a heavy momentum which must be absorbed finally by the retaining bolt in greater part.

The object of my invention is to provide a simple arrangement of friction mechanism which will permit of the main spring of the mechanism being placed under an initial compression, which will maintain all the parts in assembled relation and which will also eliminate the objections heretofore encountered in connection with retaining bolts as above indicated.

In the drawing forming a part of this specification, Figure 1 is a vertical, longitudinal, sectional view of a portion of a railway draft rigging showing my improvements in connection therewith. Fig. 2 is a vertical, transverse, sectional view taken substantially on the line 2—2 of Fig. 1. And Fig. 3 is a rear-end, elevational view of the shock absorbing mechanism proper.

In said drawing, 10—10 denotes channel-shaped center or draft sills of a railway car provided on their inner faces with the usual front and rear stop lugs with which coöperate front and rear followers 11 and 12. The drawbar 13 of the rigging is operatively associated with the shock absorbing mechanism proper by a yoke 14, and all the parts are supported by suitable means such as the detachable saddle plate 15.

The shock absorbing mechanism proper, as shown, comprises a substantially cylindrical casting A, a plurality of friction shoes B—B, a wedge C, a main spring D, a preliminary spring follower E, a short retaining bolt F and a retaining bolt spring G.

The casting A is formed at its forward end with a friction shell proper 16 and rearwardly thereof with an integral spring casing 17. The forward end of the shell 16 is provided with an inturned annular flange 18 forming a shoulder to engage the outer ends of the friction shoes B and prevent the latter from being forced out of the cylinder and maintaining the shoes in normal position. At its rear end the casing 17 is centrally perforated, as indicated at 19, and slidably mounted within said perforation is the hollow cup-shaped preliminary spring follower E. The latter, as shown, is provided with an outwardly extended annular flange 20 at its inner end, which limits the outward movement of the follower E with respect to the shell 17. The main spring D preferably consists of an outer heavy coil 21 and a lighter inner coil 22, both coils being seated at their rear ends on the follower E and at their forward ends against the friction shoes B.

Each of the shoes B is formed with a roller seat 23 to accommodate an anti-friction roller 24, there being one anti-friction roller between each shoe and the wedge C. The latter is provided with plain or flat wedge faces 25 free from the usual roller seats employed in friction mechanisms of a general type disclosed herein. The wedge C is open at its front, as indicated at 26, and is perforated, as indicated at 27, to accommodate the retaining bolt F. The latter is extended through the wedge and between the friction shoes and through a bushing 28 seated within the inner ends of the shoes B. The head of the bolt F is located at its rear inner end and the spring G is mounted on the bolt between the head thereof and the bushing 28. The nut 29 is applied to the bolt within the wedge C after the parts have been assembled.

In assembling the mechanism, the follower E is first inserted, then the spring D. The friction shoes are next applied and the same are forced in by means of a bulldozer or other suitable device so as to place the spring under an initial compression, the shoes being radially separated after they have been forced inwardly beyond the shoulder 18. As will be understood, the distance of the shoulder 18 to the rear end of the shell will be so designed as to place the springs under the desired initial compression. In inserting the shoes in place, the bolt F must also be inserted so as to leave the outer end thereof projecting beyond the friction shoes. Thereafter, the anti-friction rollers and wedge are applied and finally the nut on the bolt F.

In operation, it will be evident that the bolt F is never subjected to tension greater than that exerted by the spring G, and this tension remains substantially constant. The shock resulting from the momentum acquired by the friction elements in returning to normal position under release, is, of course, taken up by the shoulder 18 of the friction shell which can be made as strong as desired.

I claim:

1. In a friction shock absorbing mechanism, the combination with a friction shell and a spring casing, of a spring within the casing, a plurality of friction shoes coöperable with the shell and disposed therein, means on said shell to limit the outward movement of the shoes with respect thereto while the shoes are maintained in coöperative engagement with the shell, a wedge extending partly within the shoes, a retaining element extending through the wedge and rearwardly thereof, and means coöperable with said element and with said shoes to limit the outward movement of said element with respect to said shoes, said wedge being insertible after the shoes are in place within the shell and after said retaining element has been operatively associated with the shoes.

2. In a friction shock absorbing mechanism, the combination with a friction shell and spring casing, of a spring within the casing, a preliminary spring follower slidable with respect to the casing and limited in its outward movement with respect thereto, said follower being insertible through the friction shell, a plurality of friction shoes coöperable with the shell and disposed therein, means on said shell to limit the outward movement of said shoes with respect thereto, a wedge extending partly within the shoes, anti-friction rollers interposed between the wedge and shoes, a retaining bolt extending through the wedge to a point rearwardly thereof, and spring means interposed between said bolt and said shoes, said limiting means comprising an inwardly extending flange at the outer end of the friction shell, said shoes having shouldered seats for said rollers and the wedge having flat surfaces engaging said rollers to thereby permit insertion of the wedge after the shoes have been assembled within the shell.

In witness that I claim the foregoing I have hereunto subscribed my name this 19th day of Sept., 1918.

JOHN F. O'CONNOR.